Patented June 15, 1943

2,322,013

UNITED STATES PATENT OFFICE 2,322,013

CELLULOSE ETHER COMPOSITION

Carl B. Gilbert, South River, N. J., assignor to Hercules Powder Company, Wilmington, Del., a corporation of Delaware No Drawing. Application July 18, 1940, Serial No. 346,153

8 Claims. (Cl. 106—181)

This invention relates to cellulosic compositions and more particularly it relates to a composition comprising an ether of cellulose and an acyl trialkyl citrate.

The practical application of the cellulose ethers in the plastics, film, lacquer, and related fields calls for the use of softening or plasticizing agents whose function is to toughen, improve impact strength, and to lower the melting point of the cellulose ethers. However, no plasticizer has been altogether satisfactory since upon use of enough plasticizer to provide good impact strength, the compositions have been too soft to stand the ordinary stresses of use, or they have warped with time, or volatilization of the plasticizer has caused shrinkage and change in dimension. In addition, it has been very difficult to find satisfactory plasticizers which are odorless and free of chemical groups which might have undesired physiological effects.

It is an object of this invention to provide moldable compositions of cellulose ethers having a high impact strength.

It is a further object to provide compositions of cellulose ethers which are free of ingredients having chemical groups which might have undesirable physiological effects.

It is a still further object to provide cellulose ether compositions having a high impact strength and at the same time having substantially no tendency to warp with time.

It is a still further object to provide cellulose ether compositions having a high impact strength and at the same time containing no volatile ingredients causing shrinkage and change of dimension of the compositions, and cracking around inserts molded in the composition.

It is a still further object to provide cellulose ether compositions suitable for molded articles and lacquers which are free from the defect of surface dulling due to volatilization of the plasticizer used therein.

Other objects and advantages will become apparent as this invention is described.

Now in accordance with this invention these objects are obtained by compositions comprising an ether of cellulose and an acylated trialkyl citrate. Fillers, pigment, dyes, other coloring matter, resins and additional plasticizers may be incorporated in the compositions, if desired.

The ether of cellulose utilized in a composition according to this invention may be any cellulose ether of the type soluble in volatile organic solvents. Included are, for example, such cellulose ethers as ethyl cellulose, propyl cellulose, methyl cellulose, benzyl cellulose, and chemically mixed ethers such as ethyl benzyl cellulose, methyl ethyl cellulose, methyl propyl cellulose, ethyl propyl cellulose, etc. In the cellulose ether utilized, the degree of substitution will be such as to insure their solubility in volatile organic solvents such as acetone, methyl ethyl ketone, benzene, toluene, butyl acetate, ethyl acetate, or mixtures of such solvents with a lower aliphatic alcohol. In general, the degree of substitution (defined as the average number of hydroxyls substituted for each $C_6H_7O_2(OH)_3$ unit of cellulose) will be above about 2.0 units.

The ethyl ether of cellulose is particularly suitable for the compositions in accordance with this invention. Ethyl ethers having a substitution represented by an ethoxyl content between about 41% and about 51% are suitable. Preferably the ethoxyl content of the ethyl cellulose will be between about 44% and about 48%.

The acylated trialkyl citrate utilized in accordance with this invention may be such as, for example, formyl, acetyl, propionyl, butyryl, caproyl, benzoyl, etc., esters of trimethyl citrate, triethyl citrate, tripropyl citrate, tri-isopropyl citrate, tributyl citrate, tri-isobutyl citrate, etc. In general, I prefer the lower alkyl triesters of citric acid whose free hydroxyl group has been reacted upon by a lower fatty acid. These compounds may be prepared, for example, by esterifying a trialkyl citrate with a carboxylic acid anhydride such as acetic anhydride, propionic anhydride and the like with the aid of a suitable esterification catalyst such as pyridine.

The compositions in accordance with this invention will comprise 10 parts of the cellulose ether and between about 0.5 and about 5 parts of the acylated citric ester. For most purposes the composition will comprise 10 parts of the cellulose ether and between about 1 and about 4 parts of the acylated citric ester.

Optionally, fillers (including pigments by the term "fillers"), soluble dyes, soaps, waxes, etc. may be incorporated in the compositions according to this invention. Typical fillers which may be used are such as, for example, calcium carbonate, magnesium carbonate, calcium sulfate, barium sulfate, zinc oxide, zinc sulfide, silicon dioxide, titanium dioxide, chromium oxide, chrome yellow, chrome green, Prussian blue, cadmium yellow, cadmium selenide, etc. Waxes and metallic soaps such as paraffin, Montan wax, carnauba wax, Japan wax, stearic acid, zinc stearate, aluminum stearate, aluminum oleate, etc., may also be employed. Solids, fillers, and pigments are preferably utilized in no more than about 30% of the total composition. Similarly, waxes and soaps should be kept below about 5% of the composition.

Modifiers other than the acylated citric esters and which have more or less of a colloiding or toughening or plasticizing action upon cellulose ethers may be used in the composition according to this invention if desired. Where such materials are utilized, the composition will comprise 10 parts of the cellulose ether and between 0.5 and about 5 parts, preferably between about 1 part and about 4 parts, of a mixture of plasticizing ingredients, at least one-third of said mixture consisting of the acylated triester of citric acid hereinabove described. Suitable plasticizing mixtures may include such materials as, for example, dibutyl phthalate, diamyl phthalate, diethyl phthalate, chlorinated diphenyl, triphenyl phosphate, tricresyl phosphate, tributyl phosphate, castor oil, oxidized castor oil, mineral oil, triethyl citrate, tributyl citrate, and other materials compatible with a mixture of the cellulose ether and the acylated citrate ester utilized. It will be understood that such additional plasticizers will be used in a proportion in which they are compatible with the ethyl cellulose and citric ester.

Optionally, resinous materials may also be incorporated in the composition according to this invention. Where utilized such materials will be in the proportion of about 6 parts to about 0.5 part, preferably about 3 parts to about 2 parts for each 10 parts of cellulose ether employed in the composition. Such resinous materials may be natural or synthetic resins such as, for example, rosin, hydrogenated rosin, glyceryl abietate, hydrogenated glyceryl abietate, dammar gum, Manila gum, pure alkyd resin, oil-soluble phenolic type resin, rosin modified maleate, oil modified alkyd resin, rosin modified alkyd resin, etc. It will be understood that only those resins which are compatible with the mixture of cellulose ethers and plasticizer utilized will be employed.

The composition according to this invention may be prepared by mixing the ingredients thereof, homogenizing or colloiding them in a heated Banbury mill or upon a heated two roll mill entirely without the use of any volatile solvents. After the composition is colloided, it may be rolled into sheets by the use of a two roll mill, then cooled, and the sheets reduced to molding powder by a suitable reducing means such as a hammer mill or a rotary cutter. If desired, volatile solvents may be added in limited quantity in order to hasten colloiding of the mixture. In this case the materials are rolled until the major portion of the volatile solvents is removed and the composition is then sheeted or reduced to granular or powdered form after which it is seasoned for a period of time sufficient to remove substantially all of the volatile solvents. The compositions according to this invention are also useful in the form of lacquers and impregnating and coating dope. For such purposes, it is necessary only to dissolve the ingredients of the composition in a suitable solvent or solvent mixture therefor. Such solvents as benzol, toluol, ethyl acetate, acetone, methyl ethyl ketone, butyl acetate, ethyl alcohol, butyl alcohol, etc. usually in the form of solvent mixtures such as 80:20 benzol-methanol, 80:20 toluene-alcohol, 80:20 xylene-butanol, etc.

The compositions in accordance with this invention are further illustrated by the specific examples thereof shown in the tables. In the examples, specification, and the claims, all parts and percentages are by weight.

TABLE I

*Compositions suitable for the preparation of molding powder*

|  | I | II | III | IV | V | VI | VII | VIII | IX |
|---|---|---|---|---|---|---|---|---|---|
| Ethyl cellulose (48.2% ethoxyl, viscosity 99¹) | 85 | 80 | 77.3 | | | | | | |
| Ethyl cellulose (45% ethoxyl, viscosity 120¹) | | | | 77.3 | 77.3 | 77.3 | 77.3 | 77.3 | |
| Benzyl cellulose | | | | | | | | | 77.3 |
| Acetyl triethyl citrate | 15 | 20 | 9.65 | 9.65 | | | | 3.85 | 9.65 |
| Propionyl triethyl citrate | | | | | 9.65 | | | | |
| Acetyl tripropyl citrate | | | | | | 9.65 | | | |
| Acetyl tributyl citrate | | | | | | | 9.65 | | |
| Dibutyl phthalate | | | | | | | | 5.80 | |
| Resin (glyceryl ester of hydrogenated rosin and polybasic acid) | | | 9.65 | 9.65 | 9.65 | 9.65 | 9.65 | 9.65 | 9.65 |
| Japan wax | | | 3.40 | 3.40 | 3.40 | 3.40 | 3.40 | 3.40 | 3.40 |

¹ Viscosity is in centipoises and represents absolute viscosity of a 5% solution of ethyl cellulose in 80:20 toluene-alcohol at 25° C. for the 48.2% ethoxyl type, and in 70:30 toluene-alcohol at 25° C. for the 45% ethoxyl type.

The compositions of Table I were homogenized on a two roll mill heated to 280–300° F. for about 10 minutes. They were then sheeted on the rolls, ground to molding powder, and molded by the injection process.

Table II gives examples of lacquers and coating dopes of a composition in accordance with this invention.

TABLE II

*Coating dopes and lacquer*

|  | X | XI | XII | XIII | XIV |
|---|---|---|---|---|---|
| Ethyl cellulose (48.2% ethoxyl, viscosity 99) | 85 | 85 | 85 | | |
| Ethyl cellulose (47.5% ethoxyl, viscosity 14) | | | | | 10 |
| Benzyl cellulose | | | | 85 | |
| Acetyl triethyl citrate | | | | 15 | 2 |
| Propionyl triethyl citrate | 15 | | | | |
| Acetyl tripropyl citrate | | 15 | | | |
| Acetyl tributyl citrate | | | 15 | | |
| Resin (Teglac Z-154) | | | | | 10 |
| Toluene | 272 | 272 | 272 | 272 | 72 |
| Ethyl alcohol | 68 | 68 | 68 | 68 | 18 |
| Additional 80-20 toluene-alcohol (for spraying lacquer) | | | | | 35 |

The dopes of Examples X to XIII inclusive were cast upon a polished surface to form 0.001 inch films suitable as sheeting or wrapping foil. Example XIV was found to be a lacquer giving a hard, glossy coating of excellent protective and decorative value.

The compositions in accordance with this invention are suitable for molded articles, especially those prepared by the injection molding process from molding powder prepared without the use of any volatile substances. They have the particular advantage of freedom from surface dulling, shrinking, cracking around inserts, and similar disadvantages caused by volatility of plasticizer. The compositions are also suitable for wrapping foil especially for foodstuffs where the freedom from chemical groups of questionable physiological action is particularly important. The acylated trialkyl citrates used impart resistance to grease and oils. Such sheeting is conveniently prepared by casting films from dopes containing the cellulose ether and the acylated triester of citric acid dissolved in volatile solvents. The compositions may also be in the form of sheeting used for photographic film and for windows, windshields, etc. They also find use in lacquers for protective and decorative coatings and they may be used for electrical insulation, as a sizing medium for textiles, for laminating textile fabrics, and for adhesive purposes.

The term "sheeting" as used herein means self-supporting films in general, including wrapping foil, photographic film, window sheeting, and the like.

It will be understood that the details and examples hereinbefore set forth are illustrative only, and that the invention as broadly described and claimed is in no way limited thereby.

What I claim and desire to protect by Letters Patent is:

1. A composition comprising 100 parts of an ethyl ether of cellulose having an ethoxyl content in the range between about 41% and about 51% and between about 5 parts and about 50 parts of a mixture of materials capable of decreasing the softening point of the said ethyl cellulose when colloided therewith and compatible with the ethyl cellulose, at least one-third of the said mixture consisting of acetyl triethyl citrate.

2. A composition comprising 100 parts of an ethyl ether of cellulose having an ethoxyl content within the range between about 41% and about 51% and between about 5 parts and about 50 parts of acetyl triethyl citrate.

3. A molding powder comprising 100 parts of an ethyl ether of cellulose having an ethoxyl content in the range between about 41% and about 51% and between about 5 parts and about 50 parts of a mixture of materials capable of decreasing the softening point of the said ethyl cellulose when colloided therewith and compatible with the ethyl cellulose, at least one-third of the said mixture consisting of acetyl triethyl citrate.

4. Sheeting comprising 100 parts of an ethyl ether of cellulose having an ethoxyl content in the range between about 41% and about 51% and between about 5 parts and about 50 parts of a mixture of materials capable of decreasing the softening point of the said ethyl cellulose when colloided therewith and compatible with the ethyl cellulose, at least one-third of the said mixture consisting of acetyl triethyl citrate.

5. A coating composition comprising 100 parts of an ethyl ether of cellulose having an ethoxyl content in the range between about 41% and about 51% and between about 5 parts and about 50 parts of a mixture of materials capable of decreasing the softening point of the said ethyl cellulose when colloided therewith and compatible with the ethyl cellulose, at least one-third of the said mixture consisting of acetyl triethyl citrate, and a volatile organic solvent for the ethyl cellulose and acetyl triethyl citrate.

6. A composition comprising 100 parts of a cellulose ether soluble in volatile organic solvents and having a degree of substitution of at least two units for each $C_6H_7O_2(OH)_3$ unit of cellulose and between about 5 and about 50 parts of a lower (1 to 4 carbon atom) alkyl triester of citric acid esterified by a lower fatty acid.

7. A composition comprising 100 parts of a cellulose ether soluble in volatile organic solvents and having a degree of substitution of at least two units for each $C_6H_7O_2(OH)_3$ unit of cellulose and between about 5 and about 50 parts of acetyl triethyl citrate.

8. A composition comprising 100 parts of an ethyl ether of cellulose having an ethoxyl content in the range between about 41% and about 51% and between about 5 and about 50 parts of a lower (1 to 4 carbon atom) alkyl triester of citric acid esterified by a lower fatty acid.

CARL B. GILBERT.